United States Patent
Ishikawa et al.

(10) Patent No.: US 11,171,327 B2
(45) Date of Patent: *Nov. 9, 2021

(54) POSITIVE ELECTRODE ACTIVE MATERIAL CONTAINING LITHIUM COMPOSITE OXIDE AND COVERING MATERIAL AND BATTERY

(71) Applicant: Panasonic Intellectual Property Management Co., Ltd., Osaka (JP)

(72) Inventors: Takayuki Ishikawa, Osaka (JP); Ryuichi Natsui, Osaka (JP); Issei Ikeuchi, Osaka (JP); Kensuke Nakura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 354 days.

This patent is subject to a terminal disclaimer.

(21) Appl. No.: 16/212,992

(22) Filed: Dec. 7, 2018

(65) Prior Publication Data

US 2019/0221837 A1 Jul. 18, 2019

(30) Foreign Application Priority Data

Jan. 17, 2018 (JP) .............................. JP2018-005268

(51) Int. Cl.
| | |
|---|---|
| *H01M 4/36* | (2006.01) |
| *H01M 4/505* | (2010.01) |
| *H01M 4/525* | (2010.01) |
| *H01M 10/0525* | (2010.01) |
| *H01M 4/48* | (2010.01) |
| *H01M 4/485* | (2010.01) |
| *H01M 4/02* | (2006.01) |

(52) U.S. Cl.
CPC ........... *H01M 4/366* (2013.01); *H01M 4/483* (2013.01); *H01M 4/485* (2013.01); *H01M 4/505* (2013.01); *H01M 4/525* (2013.01); *H01M 10/0525* (2013.01); *H01M 2004/028* (2013.01); *H01M 2300/004* (2013.01); *H01M 2300/0065* (2013.01)

(58) Field of Classification Search
None
See application file for complete search history.

(56) References Cited

U.S. PATENT DOCUMENTS

| | | | | |
|---|---|---|---|---|
| 10,651,462 | B2* | 5/2020 | Ishikawa | H01M 4/366 |
| 10,886,529 | B2* | 1/2021 | Ishikawa | H01M 4/366 |
| 2011/0076556 | A1* | 3/2011 | Karthikeyan | H01M 4/366 |
| | | | | 429/188 |
| 2013/0168599 | A1 | 7/2013 | Kato et al. | |
| 2015/0380737 | A1 | 12/2015 | Kawasato et al. | |
| 2017/0069907 | A1* | 3/2017 | Zhu | H01M 4/366 |

FOREIGN PATENT DOCUMENTS

| | | |
|---|---|---|
| JP | 2007-257885 | 10/2007 |
| JP | 2012-038562 | 2/2012 |
| JP | 2013-065472 | 4/2013 |
| JP | 2014-130782 | 7/2014 |
| JP | 2015-135800 | 7/2015 |
| JP | 2016-026981 | 2/2016 |
| WO | 2018/163518 | 9/2018 |

* cited by examiner

*Primary Examiner* — Laura Weiner
(74) *Attorney, Agent, or Firm* — McDermott Will and Emery LLP

(57) ABSTRACT

A positive electrode active material includes a lithium composite oxide containing: at least one element selected from the group consisting of fluorine, chlorine, nitrogen, sulfur, bromine, and iodine; and a covering material that covers a surface of the lithium composite oxide. The lithium composite oxide has a crystal structure that belongs to a space group R-3 m. The ratio $I_{(003)}/I_{(104)}$ of a first integrated intensity $I_{(003)}$ of a first peak corresponding to a (003) plane to a second integrated intensity $I_{(104)}$ of a second peak corresponding to a (104) plane in an XRD pattern of the lithium composite oxide satisfies $0.62 \leq I_{(003)}/I_{(104)} \leq 0.90$. The covering material has an electron conductivity of $10^6$ S/m or less.

21 Claims, 2 Drawing Sheets

POSITIVE ELECTRODE ACTIVE MATERIAL CONTAINING LITHIUM COMPOSITE OXIDE AND COVERING MATERIAL AND BATTERY

BACKGROUND

1. Technical Field

The present disclosure relates to a positive electrode active material for batteries and a battery.

2. Description of the Related Art

Japanese Unexamined Patent Application Publication No. 2016-26981 discloses a lithium-containing composite oxide containing Li, Ni, Co, and Mn as essential components. The lithium-containing composite oxide has a crystal structure which belongs to a space group R-3m and in which the c-axis lattice constant is 14.208 to 14.228 Å and the a-axis lattice constant and the c-axis lattice constant satisfy 3a+5.615≤c≤3a+5.655. Furthermore, the integrated intensity ratio (I 003/I 104) of a peak of (003) to a peak of (104) in an XRD pattern is 1.21 to 1.39.

SUMMARY

In one general aspect, the techniques disclosed here feature a positive electrode active material including: a lithium composite oxide containing at least one element selected from the group consisting of fluorine, chlorine, nitrogen, sulfur, bromine, and iodine; and a covering material that covers a surface of the lithium composite oxide. The covering material has an electron conductivity of $10^6$ S/m or less. The lithium composite oxide has a crystal structure that belongs to a space group R-3m. The ratio $I_{(003)}/I_{(104)}$ of a first integrated intensity $I_{(003)}$ of a first peak corresponding to a (003) plane to a second integrated intensity $I_{(104)}$ of a second peak corresponding to a (104) plane in an XRD pattern of the lithium composite oxide satisfies $0.62 \leq I_{(003)}/I_{(104)} \leq 0.90$.

General or specific embodiments of the present disclosure may be implemented as a positive electrode active material for batteries, a battery, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
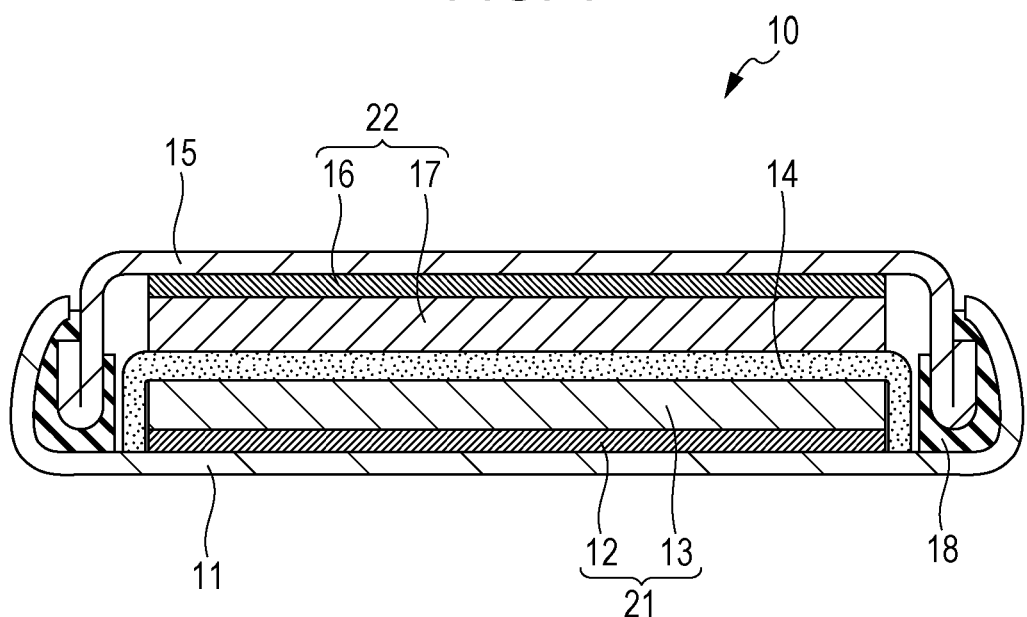
FIG. 1 is a sectional view schematically illustrating a battery that is an example of a battery according to a second embodiment.

Hereafter, embodiments of the present disclosure will be described.

First Embodiment

A positive electrode active material according to a first embodiment contains a lithium composite oxide and a covering material that covers a surface of the lithium composite oxide and has an electron conductivity of $10^6$ S/m or less. The lithium composite oxide contains one or more elements selected from the group consisting of F, Cl, N, S, Br, and I. The lithium composite oxide has a crystal structure that belongs to a space group R-3m and the integrated intensity ratio $I_{(003)}/I_{(104)}$ of a peak of a (003) plane to a peak of a (104) plane in an XRD pattern satisfies $0.62 \leq I_{(003)}/I_{(104)} \leq 0.90$.

This configuration can provide batteries having good cycle characteristics.

The term "batteries having good cycle characteristics" refers to batteries having a high capacity retention even after a charge-discharge cycle is repeatedly performed a plurality of times. In other words, the batteries having good cycle characteristics are batteries whose capacity does not considerably decrease even after a charge-discharge cycle is repeatedly performed a plurality of times.

In the case where, for example, a lithium ion battery is produced using the above-described positive electrode active material, the lithium ion battery has an oxidation-reduction potential (based on $Li/Li_+$) of about 3.6 V. In the lithium ion battery, the capacity retention after 20 cycles of a charge-discharge test is about 80% or more.

The lithium composite oxide contains one or more elements selected from the group consisting of F, Cl, N, S, Br, and I. By partly replacing oxygen with such an anion that is electrochemically inactive, the crystal structure is believed to be stabilized. Therefore, it is believed that the discharge capacity or operating voltage of the battery is improved, which increases the energy density.

In the lithium composite oxide, the integrated intensity ratio $I_{(003)}/I_{(104)}$ of a peak of a (003) plane to a peak of a (104) plane in an X-ray diffraction (XRD) pattern satisfies $0.62 \leq I_{(003)}/I_{(104)} \leq 0.90$.

The ratio $I_{(003)}/I_{(104)}$ is a parameter that is an index of cation mixing in a lithium composite oxide having a crystal structure that belongs to space group R-3m. The term "cation mixing" in the present disclosure refers to a state in which a lithium atom and a cation atom such as a transition metal are replaced with each other in a crystal structure of the lithium composite oxide. As the degree of cation mixing decreases, the ratio $I_{(003)}/I_{(104)}$ increases. As the degree of cation mixing increases, the ratio $I_{(003)}/I_{(104)}$ decreases.

In the lithium composite oxide according to the first embodiment, if the ratio $I_{(003)}/I_{(104)}$ is more than 0.90, the cation mixing is suppressed, which decreases the number of three-dimensional diffusion paths of lithium. Consequently, the diffusion of lithium is inhibited and the energy density is decreased.

If the ratio $I_{(003)}/I_{(104)}$ is less than 0.62, the crystal structure is destabilized. Consequently, the crystal structure is broken when Li is deintercalated during charge, which decreases the energy density.

Since the lithium composite oxide according to the first embodiment satisfies $0.62 \leq I_{(003)}/I_{(104)} \leq 0.90$, a lithium atom and a cation atom such as a transition metal are believed to be sufficiently subjected to cation mixing. Therefore, it is believed that the number of three-dimensional diffusion paths of lithium increases in the lithium composite oxide according to the first embodiment. Thus, the lithium composite oxide according to the first embodiment allows a larger amount of Li to be intercalated and deintercalated than known positive electrode active materials.

Since the lithium composite oxide according to the first embodiment has a crystal structure that belongs to a space group R-3m and $0.62 I_{(003)}/I_{(104)} \leq 0.90$ is satisfied, a transition metal-anion octahedron serving as a pillar three-dimensionally forms a network even when a large amount of Li is extracted, and thus the crystal structure can be stably maintained. Therefore, the positive electrode active material according to the first embodiment is suitable for providing high-capacity batteries. For the same reason, the positive electrode active material according to the first embodiment is also suitable for providing batteries having good cycle characteristics.

Herein, for example, Japanese Unexamined Patent Application Publication No. 2016-26981 is taken as a comparative example. This document discloses a positive electrode active material containing a lithium composite oxide which has a crystal structure that belongs to a space group R-3m and in which a lithium atom and a cation atom such as a transition metal are not sufficiently subjected to cation mixing. In the related art, it has been considered that cation mixing should be suppressed in a lithium composite oxide.

The lithium composite oxide according to the first embodiment contains one or more elements selected from the group consisting of F, Cl, N, S, Br, and I. The lithium composite oxide has a crystal structure that belongs to a space group R-3m, and the integrated intensity ratio $I_{(003)}/I_{(104)}$ of a peak of a (003) plane to a peak of a (104) plane in an XRD pattern satisfies $0.62 \leq I_{(003)}/I_{(104)} \leq 0.90$. Thus, the present inventors have realized a high-energy-density battery that is beyond expectation in the related art.

When a typical positive electrode active material is used at a high potential, the decomposition (e.g., side reaction) of an electrolyte is facilitated, which generates a resistance layer. Furthermore, when a typical positive electrode active material is used at a high potential, anions contained in the positive electrode active material separate in the form of gas. This may degrade the cycle characteristics.

The positive electrode active material according to the first embodiment further contains a covering material in addition to the above-described lithium composite oxide. The covering material covers a surface of the above-described lithium composite oxide. The covering material has an electron conductivity of $10^6$ S/m or less and is a material different from the lithium composite oxide. When the covering material covers a surface of the lithium composite oxide, the contact between the lithium composite oxide and the electrolyte is suppressed. The low electron conductivity of the covering material suppresses the transfer of electrons between the lithium composite oxide and the electrolyte, and the side reactions caused by the transfer of electrons can be suppressed. Thus, the generation of a resistance layer or the separation in the form of gas is suppressed. Therefore, batteries having good cycle characteristics can be provided.

That is, even when the positive electrode active material according to the first embodiment is used at a high potential, batteries having good cycle characteristics can be provided.

In the present disclosure, the phrase "cover a surface" includes a state in which a surface is completely covered and a state in which a surface is partly covered.

In the first embodiment, the mass ratio of the covering material to the above-described lithium composite oxide may be 0.2 or less.

This configuration can suppress the electrochemical inactivation of the surface of the positive electrode active material according to the first embodiment. This can suppress an increase in the resistance. Thus, batteries having higher capacity and better cycle characteristics can be provided.

In the first embodiment, the mass ratio of the covering material to the above-described lithium composite oxide may be 0.01 or more and 0.1 or less.

This configuration can provide batteries having higher capacity and better cycle characteristics.

The covering material according to the first embodiment may cover a surface of the above-described lithium composite oxide with a thickness of 0.1 nm or more and 2.0 nm or less.

This configuration can provide batteries having higher capacity and better cycle characteristics.

When the covering material has a thickness of 0.1 nm or more, the uniformity of the thickness can be improved. Furthermore, when the covering material has a thickness of 0.1 nm or more, the dielectric breakdown can be suppressed.

When the covering material has a thickness of 2.0 nm or less, the inhibition of Li conduction due to the covering material can be suppressed.

The covering material according to the first embodiment may chemically modify a surface of the above-described lithium composite oxide.

The covering material according to the first embodiment may form a solid solution with at least a part of the surface of the above-described lithium composite oxide.

This configuration can provide batteries having better cycle characteristics because elution (e.g., elimination) of metal elements can be further suppressed.

The covering material according to the first embodiment is, for example, an inorganic material.

The covering material according to the first embodiment may be at least one material selected from the group consisting of oxides, halogen compounds, sulfides, and phosphorus compounds.

For example, the halogen compound may be $AlF_3$.

The covering material according to the first embodiment may be a lithium ion conductor.

For example, the lithium ion conductor may be one or more materials selected from the group consisting of $LiBO_2$, $Li_3PO_4$, $LiNbO_3$, $LiNbO_2$, $LiAlO_2$, $Li_2SO_4$, $Li_2MoO_4$, $Li_4SiO_4$, $Li_4FeO_4$, $Li_4ZrO_4$, $Li_2CO_3$, $LiW_2O_7$, $Li_3VO_4$, LiCl, LiBr, LiI, $Li_2Se$, and various lithium ion conductive glasses such as $Li_2O$—$B_2O_3$, $Li_2O$-$Al_2O_3$, $Li_2O$—$SiO_2$, $Li_2O$—$P_2O_5$, LiF—$BF_3$, LiF—$AlF_3$, and LiF—$VF_3$.

This configuration can provide batteries having better cycle characteristics.

The covering material according to the first embodiment may be an oxide.

This configuration can provide batteries having better cycle characteristics. Oxides are chemically stable and have low reactivity with an electrolyte. Therefore, it is believed that by using oxides, the crystal structure is easily maintained in an electrochemical reaction.

The covering material according to the first embodiment may be an oxide represented by composition formula (1) below.

$$Li_a A_b O_c \qquad \text{formula (1)}$$

Herein, A may represent one or more elements selected from the group consisting of Mn, Co, Ni, Fe, Cu, Nb, Mo, Ti, Al, Cr, Zr, Zn, Na, K, Ca, Mg, Pt, Au, P, Eu, Sm, Ce, and H.

Furthermore, the following conditions may be satisfied:

$0 \leq a \leq 3$, $0.5 \leq b \leq 4$, and $1 \leq c \leq 4$.

This configuration can provide batteries having better cycle characteristics.

The covering material according to the first embodiment may be a Li-containing oxide having high Li conductivity.

For example, the Li-containing oxide may be one or more oxides selected from the group consisting of lithium borate, lithium niobate, lithium cobaltate, lithium titanate, and lithium aluminate.

In this configuration, the diffusibility of Li ions is improved and thus batteries having higher capacity can be provided.

When the covering material according to the first embodiment is capable of occluding Li during charge-discharge reaction, batteries having higher capacity can be provided. In this case, the covering material has a charge-discharge capacity. Therefore, even if the mass ratio of the lithium composite oxide to the entire positive electrode active material is decreased by adding the covering material, high capacity of the battery is maintained.

The covering material according to the first embodiment may be, for example, one or more oxides selected from the group consisting of $MnO_2$, $Al_2O_3$, $MgO$, $ZrO_2$, $ZnO$, $TiO_2$, $H_3BO_3$, $Mn_2O_3$, $Fe_2O_3$, $CuO$, $NiO$, $Co_3O_4$, $Eu_2O_3$, $Sm_2O_3$, $CeO_2$, and $SiO_2$.

This configuration can provide batteries having better cycle characteristics.

The covering material according to the first embodiment may be one or more oxides selected from the group consisting of $Al_2O_3$, $ZrO_2$, $ZnO$, $TiO_2$, and $SiO_2$.

This configuration can provide batteries having better cycle characteristics.

The covering material according to the first embodiment may be a transition metal oxide.

This configuration can provide batteries having better cycle characteristics.

The covering material according to the first embodiment may contain the same metal element as that contained in the above-described lithium composite oxide.

In this configuration, the metal elements firmly bond to each other through, for example, formation of a solid solution at an interface between the lithium composite oxide and the covering material. Therefore, the elution (e.g., elimination) of the metal element is suppressed. This configuration can provide batteries having better cycle characteristics.

The covering material according to the first embodiment may be one or more materials selected from the group consisting of graphite, carbon black, and graphite fluoride. Examples of the carbon black include acetylene black, Ketjenblack (registered trademark), channel black, furnace black, lamp black, and thermal black.

This configuration can provide batteries having better cycle characteristics.

The covering material may be an insulating compound. The covering material does not necessarily contribute to an electrochemical reaction.

The lithium composite oxide according to the first embodiment may satisfy $0.67 \leq I_{(003)}/I_{(104)} \leq 0.85$.

This configuration can provide batteries having a higher energy density.

In general, the peaks of a (003) plane and a (104) plane in a CuKα XRD pattern are present at diffraction angles 2θ of 18° to 20° and 44° to 46°.

The integrated intensity of each diffraction peak can be calculated using, for example, software included with an XRD instrument (e.g., PDXL included with a powder X-ray diffraction instrument manufactured by Rigaku Corporation). In this case, the integrated intensity of each diffraction peak can be determined by, for example, calculating an area within ±3° of an angle of each diffraction peak.

The lithium composite oxide according to the first embodiment may contain one or more elements selected from the group consisting of F, Cl, N, and S.

This configuration can provide batteries having a higher energy density.

The lithium composite oxide according to the first embodiment may contain F.

In this configuration, the cation-anion interaction is increased by partly replacing oxygen with F, which has a high electronegativity, thereby improving the discharge capacity or operating voltage of the battery. Furthermore, by partly replacing oxygen with F, which has a large ionic radius, crystal lattice expansion is caused and the structure is stabilized. Therefore, batteries having a higher energy density can be provided.

The lithium composite oxide according to the first embodiment may contain, for example, one or more elements selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al.

This configuration can provide batteries having a higher energy density.

The lithium composite oxide according to the first embodiment may contain at least one element selected from the group consisting of Mn, Co, Ni, Fe, Cu, V, Ti, Cr, and Zn, that is, at least one 3d transition metal element.

This configuration can provide batteries having a higher energy density.

The lithium composite oxide according to the first embodiment may contain one or more elements selected from the group consisting of Mn, Co, and Ni.

In this configuration, the elimination of oxygen during charge is suppressed by using a transition metal having orbitals easily hybridized with those of oxygen. This stabilizes the crystal structure and can provide batteries having a higher energy density.

The lithium composite oxide according to the first embodiment may contain Mn.

In this configuration, the elimination of oxygen during charge is suppressed by using Mn having orbitals easily hybridized with those of oxygen. This stabilizes the crystal structure and can provide batteries having a higher energy density.

The lithium composite oxide according to the first embodiment may contain Mn and one or more elements selected from the group consisting of Co, Ni, Fe, Al, Cu, V, Nb, Mo, Ti, Cr, Zr, Zn, Na, K, Ca, Mg, Pt, Au, Ag, Ru, W, B, Si, and P.

In this configuration, the elimination of oxygen during charge is suppressed compared with the case where only Mn is used as a cation element other than Li. This stabilizes the crystal structure and can provide batteries having a higher energy density.

The lithium composite oxide according to the first embodiment may contain Mn and one or more elements selected from the group consisting of Co and Ni.

This configuration can provide batteries having a higher energy density.

Next, an example of the chemical composition of the lithium composite oxide according to the first embodiment will be described.

The lithium composite oxide according to the first embodiment may be a compound represented by composition formula (2) below.

$$Li_x Me_y O_\alpha X_\beta \qquad \text{formula (2)}$$

Herein, Me may represent one or more elements selected from the group consisting of Mn, Co, Ni, Fe, Al, Cu, V, Nb, Mo, Ti, Cr, Zr, Zn, Na, K, Ca, Mg, Pt, Au, Ag, Ru, W, B, Si, and P.

Me may include at least one element selected from the group consisting of Mn, Co, Ni, Fe, Cu, V, Ti, Cr, and Zn, that is, at least one 3d transition metal element.

X may represent one or more elements selected from the group consisting of F, Cl, N, S, Br, and I.

Furthermore, the following conditions may be satisfied in the composition formula (2):

$0.5 \leq x \leq 1.5$, $0.5 \leq y \leq 1.0$, $1 \leq \alpha \leq 2$, and $0 < \beta \leq 1$.

This configuration can provide batteries having a higher energy density.

In the first embodiment, when Me is constituted by two or more elements (e.g., Me' and Me") and the composition ratio is "Me'$_{y1}$Me"$_{y2}$", "y=y1+y2" is given. For example, when Me is constituted by two elements (Mn and Co) and the composition ratio is "Mn$_{0.4}$Co$_{0.4}$", "y=0.4+0.4=0.8" is given. In the case where X is constituted by two or more elements, the calculation is conducted in the same manner as in the case of Me.

When x is 0.5 or more in the compound represented by the composition formula (2), the amount of Li that can be used is increased. This increases the energy density.

When x is 1.5 or less in the compound represented by the composition formula (2), the oxidation-reduction reaction of Me can be more utilized. As a result, the oxidation-reduction reaction of oxygen is less utilized. Thus, the crystal structure is stabilized. This increases the energy density.

When y is 0.5 or more in the compound represented by the composition formula (2), the oxidation-reduction reaction of Me can be more utilized. As a result, the oxidation-reduction reaction of oxygen is less utilized. Thus, the crystal structure is stabilized. This increases the energy density.

When y is 1.0 or less in the compound represented by the composition formula (2), the amount of Li that can be used is increased. This increases the energy density.

When α is 1 or more in the compound represented by the composition formula (2), the amount of charge compensation due to the oxidation-reduction reaction of oxygen can be prevented from decreasing. This increases the energy density.

When α is less than 2 in the compound represented by the composition formula (2), an excess increase in the capacity due to the oxidation-reduction reaction of oxygen can be prevented, which stabilizes a structure when Li is deintercalated. This increases the energy density.

When β is more than 0 in the compound represented by the composition formula (2), the structure is stabilized by the influence of X that is electrochemically inactive when Li is deintercalated. This increases the energy density.

When β is 1 or less in the compound represented by the composition formula (2), the influence of X that is electrochemically inactive can be prevented from increasing, which improves the electron conductivity. This increases the energy density.

The compound represented by the composition formula (2) may satisfy $1.67 \leq \alpha \leq 1.95$.

This configuration can provide batteries having a higher energy density.

The compound represented by the composition formula (2) may satisfy $0.05 \leq \beta \leq 0.33$.

This configuration can provide batteries having a higher energy density.

The compound represented by the composition formula (2) may satisfy $0.5 \leq x/y \leq 3.0$.

This configuration can provide batteries having a higher energy density.

When x/y is 0.5 or more, the amount of Li that can be used is increased. Furthermore, the inhibition of formation of Li diffusion paths can be prevented. This increases the energy density. When x/y is 3.0 or less, the oxidation-reduction reaction of Me can be more utilized. As a result, the oxidation-reduction reaction of oxygen is less utilized. Furthermore, the crystal structure is stabilized when Li is destabilized during charge, and the efficiency of intercalating Li during discharge is improved. This increases the energy density.

The compound represented by the composition formula (2) may satisfy $1.5 \leq x/y \leq 2.0$.

In this configuration, the ratio of the number of Li atoms at sites at which Li atoms are located is larger than that of known positive electrode active materials (e.g., LiMnO$_2$). This allows a larger amount of Li to be intercalated and deintercalated. This can provide batteries having a higher energy density.

The compound represented by the composition formula (2) may satisfy $5 \leq \alpha/\beta \leq 39$.

This configuration can provide batteries having a higher energy density.

When α/β is 5 or more, the amount of charge compensation due to the oxidation-reduction reaction of oxygen is increased. Furthermore, an increase in the influence of X that is electrochemically inactive can be prevented, which improves the electron conductivity. This increases the energy density. When α/β is 39 or less, an excess increase in the capacity due to the oxidation-reduction reaction of oxygen can be prevented, which stabilizes a structure when Li is deintercalated. Furthermore, the structure is stabilized by the influence of X that is electrochemically inactive when Li is deintercalated. This increases the energy density.

The compound represented by the composition formula (2) may satisfy $9 \leq \beta/\beta \leq 19$.

This configuration can provide batteries having a higher energy density.

The compound represented by the composition formula (2) may satisfy $0.75 \leq (x+y)/(\alpha+\beta) \leq 1.15$.

This configuration can provide batteries having a higher energy density.

When (x+y)/(α+β) is 0.75 or more, the generation of a large amount of impurities due to phase separation during synthesis can be prevented. This increases the energy density. When (x+y)/(α+β) is 1.15 or less, a structure with a small amount of anion deficiency is formed, and thus the crystal structure is stabilized when Li is deintercalated during charge and the efficiency of intercalating Li during discharge is improved. This increases the energy density.

In the compound represented by the composition formula (2), X may include one or more elements selected from the group consisting of F, Cl, N, and S.

This configuration can provide batteries having a higher energy density.

In the compound represented by the composition formula (2), X may include F.

That is, X may be F.

Alternatively, X may include F and one or more elements selected from the group consisting of Cl, N, S, Br, and I.

In this configuration, the cation-anion interaction is increased by partly replacing oxygen with F, which has a high electronegativity, thereby improving the discharge capacity or operating voltage of the battery. Furthermore, by partly replacing oxygen with F, which has a large ionic radius, crystal lattice expansion is caused and the structure is stabilized. Therefore, batteries having a higher energy density can be provided.

In the compound represented by the composition formula (2), Me may include one or more elements selected from the group consisting of Mn, Co, and Ni.

In this configuration, the elimination of oxygen during charge is suppressed by using a transition metal having orbitals easily hybridized with those of oxygen. This stabilizes the crystal structure and can provide batteries having a higher energy density.

In the compound represented by the composition formula (2), Me may include Mn.

That is, Me may be Mn.

In this configuration, the elimination of oxygen during charge is suppressed by using Mn having orbitals easily hybridized with those of oxygen. This stabilizes the crystal structure and can provide batteries having a higher energy density.

Alternatively, Me may include Mn and one or more elements selected from the group consisting of Co, Ni, Fe, Al, Cu, V, Nb, Mo, Ti, Cr, Zr, Zn, Na, K, Ca, Mg, Pt, Au, Ag, Ru, W, B, Si, and P.

In this configuration, the elimination of oxygen during charge is further suppressed compared with the case where only Mn is used as a cation element other than Li. This stabilizes the crystal structure and can provide batteries having a higher energy density.

Me may include Mn and one or more elements selected from the group consisting of Co and Ni.

This configuration can provide batteries having a higher energy density.

The Mn content in Me may be 40 mol % or more. That is, the molar ratio (Mn/Me ratio) of Mn to Me including Mn may be 0.4 to 1.0.

In this configuration, the elimination of oxygen during charge is suppressed by sufficiently adding Mn having orbitals easily hybridized with those of oxygen. This stabilizes the crystal structure and can provide batteries having a higher energy density.

In the lithium composite oxide according to the first embodiment, Li may be partly replaced with an alkali metal such as Na or K.

The positive electrode active material according to the first embodiment may contain the above-described lithium composite oxide as a main component (i.e., 50% or more relative to the entire positive electrode active material on a mass basis (50 mass % or more)).

This configuration can provide batteries having a higher energy density.

The positive electrode active material according to the first embodiment may contain 70% or more (70 mass % or more) of the lithium composite oxide relative to the entire positive electrode active material on a mass basis.

This configuration can provide batteries having a higher energy density.

The positive electrode active material according to the first embodiment may contain 90% or more (90 mass % or more) of the lithium composite oxide relative to the entire positive electrode active material on a mass basis.

This configuration can provide batteries having a higher energy density.

The positive electrode active material according to the first embodiment may further contain unavoidable impurities in addition to the above-described lithium composite oxide and covering material.

The positive electrode active material according to the first embodiment may further contain, in addition to the above-described lithium composite oxide and covering material, at least one selected from the group consisting of a starting material used when the positive electrode active material is synthesized, a by-product, and a decomposition product.

The positive electrode active material according to the first embodiment may contain only the above-described lithium composite oxide and covering material except for, for example, unavoidable impurities.

This configuration can provide batteries having better cycle characteristics and a higher energy density.

Method for Producing Positive Electrode Active Material

Hereafter, an example of a method for producing a lithium composite oxide contained in the positive electrode active material according to the first embodiment will be described.

The lithium composite oxide according to the first embodiment can be produced by, for example, the following method.

A raw material containing Li, a raw material containing Me, and a raw material containing X are provided.

Examples of the raw material containing Li include oxides such as $Li_2O$ and $Li_2O_2$, salts such as $Li_2CO_3$ and LiOH, and lithium composite oxides such as $LiMeO_2$ and $LiMe_2O_4$.

Examples of the raw material containing Me include oxides in various oxidation states such as $Me_2O_3$, salts such as $MeCO_3$ and $MeNO_3$, hydroxides such as $Me(OH)_2$ and MeOOH, and lithium composite oxides such as $LiMeO_2$ and $LiMe_2O_4$.

For example, when Me represents Mn, examples of the raw material containing Mn include manganese oxides in various oxidation states such as $MnO_2$ and $Mn_2O_3$, salts such as $MnCO_3$ and $MnNO_3$, hydroxides such as $Mn(OH)_2$ and MnOOH, and lithium composite oxides such as $LiMnO_2$ and $LiMn_2O_4$.

Examples of the raw material containing X include lithium halides, transition metal halides, transition metal sulfides, and transition metal nitrides.

For example, when X represents F, examples of the raw material containing F include LiF and transition metal fluorides.

These raw materials are weighed so as to have, for example, the molar ratio in the composition formula (2).

Thus, "x, y, α, and β" in the composition formula (2) can be changed within the range in the composition formula (2).

The weighed raw materials are mixed with each other by, for example, a dry process or a wet process and mechanochemically reacted for 10 hours or more to obtain a compound. For example, a mixer such as a ball mill can be used.

Then, the obtained compound is further fired in the air to obtain a lithium composite oxide according to the first embodiment.

The heat treatment conditions are appropriately set so that the lithium composite oxide according to the first embodiment is obtained. Although the optimum heat treatment conditions vary depending on other production conditions and the target composition, the present inventors have found that the ratio $I_{(003)}/I_{(104)}$ tends to increase as the heat treatment temperature increases or as the heat treatment time increases. Therefore, manufacturers can determine the heat treatment conditions on the basis of this tendency. The heat treatment temperature may be selected from, for example, the range of 300° C. to 700° C. and the heat treatment time may be selected from, for example, the range of 1 to 5 hours.

By controlling the raw materials used, the mixing conditions of the raw materials, and the firing conditions as described above, the lithium composite oxide according to the first embodiment can be substantially obtained.

The energy required for mixing the elements can be further decreased by using, for example, a lithium-transition metal composite oxide as a precursor. This provides a lithium composite oxide with a higher purity according to the first embodiment.

The composition of the obtained lithium composite oxide can be determined by, for example, ICP emission spectrometry, an inert gas fusion-infrared absorption method, ion chromatography, or a combination thereof.

The space group of the crystal structure in the obtained lithium composite oxide can be determined by powder x-ray diffraction analysis.

As described above, the method for producing a lithium composite oxide according to the first embodiment includes (a) a step of providing raw materials and (b) a step of mechanochemically reacting the raw materials and then performing firing in the air to obtain a lithium composite oxide.

The step (a) may include a step of preparing a raw material mixture by mixing the above raw materials such that the molar ratio of Li to Me is 0.5 or more and 3.0 or less.

Herein, the step (a) may include a step of producing a lithium composite oxide serving as a raw material by a publicly known method.

The step (a) may include a step of preparing a raw material mixture by mixing the above raw materials such that the molar ratio of Li to Me is 1.5 or more and 2.0 or less.

The step (b) may include a step of mechanochemically reacting the raw materials using a ball mill.

As described above, the lithium composite oxide according to the first embodiment can be synthesized by mechanochemically reacting the precursor (e.g., $Li_2O$, transition metal oxide, and lithium composite oxide) using a planetary ball mill and then performing firing in the air.

Hereafter, an example of a method for treating a covering material contained in the positive electrode active material according to the first embodiment will be described.

Any treatment method for further adding the covering material according to the first embodiment to the obtained lithium composite oxide may be employed. Examples of the treatment method that may be employed include an atomic layer deposition method, a neutralization reaction, a silane coupling reaction, a sol-gel process, and use of a planetary ball mill.

The covering material according to the first embodiment is, for example, a metal oxide. The metal oxide may be treated by, for example, a neutralization reaction. For example, an acidic salt of metal oxide may be added to an alkaline aqueous solution containing the lithium composite oxide dissolved therein. This causes a neutralization reaction and thus a metal oxide coating film can be formed on the surface of the lithium composite oxide. Examples of the acidic salt of metal oxide include manganese nitrate, magnesium nitrate, aluminum sulfate, calcium nitrate, sodium nitrate, potassium nitrate, and titanium sulfate.

The method for treating a covering material may be, for example, an atomic layer deposition method. Thus, a coating film of the covering material can be formed on the surface of the lithium composite oxide. Examples of the covering material include alumina, titanium oxide, zirconium oxide, zinc oxide, and tantalum oxide.

The presence of the lithium composite oxide and covering material contained in the positive electrode active material according to the first embodiment (e.g., covering of the surface of the lithium composite oxide with the covering material) can be observed by, for example, X-ray photoelectron spectroscopy or use of a scanning electron microscope or a transmission electron microscope.

Second Embodiment

Hereafter, a second embodiment will be described. Note that the same description as in the first embodiment will be appropriately omitted to avoid redundancy.

A battery according to the second embodiment includes a positive electrode containing the positive electrode active material according to the first embodiment, a negative electrode, and an electrolyte.

This configuration can provide batteries having good cycle characteristics.

In the battery according to the second embodiment, the positive electrode may include a positive electrode active material layer. Herein, the positive electrode active material layer may contain the positive electrode active material according to the first embodiment as a main component (i.e., 50% or more relative to the entire positive electrode active material layer on a mass basis (50 mass % or more)).

This configuration can provide batteries having better cycle characteristics.

Alternatively, in the battery according to the second embodiment, the positive electrode active material layer may contain 70% or more (70 mass % or more) of the positive electrode active material according to the first embodiment relative to the entire positive electrode active material layer on a mass basis.

This configuration can provide batteries having better cycle characteristics.

Alternatively, in the battery according to the second embodiment, the positive electrode active material layer may contain 90% or more (90 mass % or more) of the positive electrode active material according to the first embodiment relative to the entire positive electrode active material layer on a mass basis.

This configuration can provide batteries having better cycle characteristics.

The battery according to the second embodiment can be used for, for example, lithium ion secondary batteries, nonaqueous electrolyte secondary batteries, and all-solid-state batteries.

The negative electrode of the battery according to the second embodiment may contain, for example, a negative electrode active material capable of occluding and releasing lithium ions. Alternatively, the negative electrode may contain, for example, a material capable of dissolving and precipitating lithium metal as a negative electrode active material.

In the battery according to the second embodiment, the electrolyte may be, for example, a nonaqueous electrolyte (e.g., nonaqueous electrolytic solution).

In the battery according to the second embodiment, the electrolyte may be, for example, a solid electrolyte.

FIG. 1 is a sectional view illustrating a schematic structure of a battery 10 that is an example of the battery according to the second embodiment.

As illustrated in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with, for example, a nonaqueous electrolyte (e.g., nonaqueous electrolytic solution).

The positive electrode 21, the negative electrode 22, and the separator 14 constitute an electrode assembly.

The electrode assembly is accommodated in the case 11.

The case 11 is sealed using the gasket 18 and the sealing plate 15.

The positive electrode 21 includes a positive electrode current collector 12 and a positive electrode active material layer 13 disposed on the positive electrode current collector 12.

The positive electrode current collector 12 is made of, for example, a metal material (e.g., aluminum, stainless steel, or aluminum alloy).

The positive electrode current collector 12 may be omitted, and the case 11 may be used as a positive electrode current collector.

The positive electrode active material layer 13 contains the positive electrode active material according to the first embodiment.

The positive electrode active material layer 13 may optionally contain, for example, additives (e.g., a conductive agent, an ion conductive auxiliary agent, and a binding agent).

The negative electrode 22 includes a negative electrode current collector 16 and a negative electrode active material layer 17 disposed on the negative electrode current collector 16.

The negative electrode current collector 16 is made of, for example, a metal material (e.g., aluminum, stainless steel, or aluminum alloy).

The negative electrode current collector 16 may be omitted, and the sealing plate 15 may be used as a negative electrode current collector.

The negative electrode active material layer 17 contains a negative electrode active material.

The negative electrode active material layer 17 may optionally contain, for example, additives (a conductive agent, an ion conductive auxiliary agent, and a binding agent).

Examples of the negative electrode active material include metal materials, carbon materials, oxides, nitrides, tin compounds, and silicon compounds.

The metal material may be a single metal or an alloy. Examples of the metal material include lithium metal and lithium alloys.

Examples of the carbon material include natural graphite, coke, partially graphitized carbon, carbon fiber, spherical carbon, artificial graphite, and amorphous carbon.

From the viewpoint of capacity density, the negative electrode active material may be silicon (Si), tin (Sn), a silicon compound, or a tin compound. The silicon compound and the tin compound may each be an alloy or a solid solution.

An example of the silicon compound is $SiO_x$ ($0.05<x<1.95$). A compound (alloy or solid solution) obtained by partly replacing a silicon atom of $SiO_x$ with another element may also be used. The other element is at least one element selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ ($0<x<2$), $SnO_2$, and $SnSiO_3$. One tin compound selected from the foregoing may be used alone. Alternatively, two or more tin compounds selected from the foregoing may be used in combination.

The negative electrode active material may have any form. A negative electrode active material having a publicly known form (e.g., particulate form or fibrous form) can be used.

Lithium may be supplied (occluded) to the negative electrode active material layer 17 by any method. Specifically, the method is a method (a) in which lithium is deposited onto the negative electrode active material layer 17 by a gas phase method such as a vacuum deposition method or a method (b) in which a lithium metal foil and the negative electrode active material layer 17 are heated while being in contact with each other. By any of the methods, lithium can be diffused into the negative electrode active material layer 17 using heat. Alternatively, lithium may be electrochemically occluded into the negative electrode active material layer 17. Specifically, a battery is assembled using a negative electrode 22 not containing lithium and a lithium metal foil (positive electrode). Then, the battery is charged so that lithium is occluded into the negative electrode 22.

Examples of the binding agent for the positive electrode 21 and the negative electrode 22 include polyvinylidene fluoride, polytetrafluoroethylene, polyethylene, polypropylene, aramid resin, polyimide, polyimide, polyimide-imide, polyacrylonitrile, polyacrylic acid, poly(methyl acrylate), poly(ethyl acrylate), poly(hexyl acrylate), polymethacrylic acid, poly(methyl methacrylate), poly(ethyl methacrylate), poly(hexyl methacrylate), polyvinyl acetate, polyvinylpyrrolidone, polyether, polyether sulfone, hexafluoropolypropylene, styrene-butadiene rubber, and carboxymethyl cellulose. Alternatively, the binding agent may be a copolymer of two or more materials selected from the group consisting of tetrafluoroethylene, hexafluoroethane, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid, and hexadiene. The binding agent may be a mixture of two or more materials selected from the foregoing materials.

Examples of the conductive agent for the positive electrode 21 and the negative electrode 22 include graphite, carbon black, conductive fibers, graphite fluoride, metal powder, conductive whiskers, conductive metal oxides, and organic conductive materials. Examples of the graphite include natural graphite and artificial graphite. Examples of the carbon black include acetylene black, Ketjenblack (registered trademark), channel black, furnace black, lamp black, and thermal black. An example of the metal powder is an aluminum powder. Examples of the conductive whiskers include zinc oxide whiskers and potassium titanate whiskers. An example of the conductive metal oxides is titanium oxide. An example of the organic conductive materials is a phenylene derivative.

The surface of the binding agent may be covered with a material used as the conductive agent. For example, the surface of the binding agent may be covered with carbon black. This increases the capacity of the battery.

The separator 14 may be made of a material having high ion permeability and sufficient mechanical strength. Examples of the material include microporous thin films, woven fabric, and nonwoven fabric. Specifically, the separator 14 is desirably made of a polyolefin such as polypropylene or polyethylene. The separator 14 made of a polyolefin has not only high durability, but also a shutdown function exhibited when excessively heated. The separator 14 has a thickness of, for example, 10 to 300 μm (or 10 to 40 μm). The separator 14 may be a single-layer film made of one material. Alternatively, the separator 14 may be a composite film (multilayer film) made of two or more materials. The separator 14 has a porosity of, for example, 30% to 70% (or 35% to 60%). The term "porosity" refers to a proportion of the volume of pores to the total volume of the separator 14. The "porosity" is measured by, for example, mercury intrusion.

The nonaqueous electrolytic solution contains a nonaqueous solvent and a lithium salt dissolved in the nonaqueous solvent.

Examples of the nonaqueous solvent include cyclic carbonate solvents, linear carbonate solvents, cyclic ether solvents, linear ether solvents, cyclic ester solvents, linear ester solvents, and fluorinated solvents.

Examples of the cyclic carbonate solvents include ethylene carbonate, propylene carbonate, and butylene carbonate.

Examples of the linear carbonate solvents include dimethyl carbonate, ethyl methyl carbonate, and diethyl carbonate.

Examples of the cyclic ether solvents include tetrahydrofuran, 1,4-dioxane, and 1,3-dioxolane.

Examples of the linear ether solvents include 1,2-dimethoxyethane and 1,2-diethoxyethane.

An example of the cyclic ester solvents is γ-butyrolactone.

An example of the linear ester solvents is methyl acetate.

Examples of the fluorinated solvents include fluoroethylene carbonate, methyl fluoropropionate, fluorobenzene, fluoroethyl methyl carbonate, and fluorodimethylene carbonate.

One nonaqueous solvent selected from the foregoing solvents may be used alone. Alternatively, two or more nonaqueous solvents selected from the foregoing solvents may be used in combination.

The nonaqueous electrolytic solution may contain at least one fluorinated solvent selected from the group consisting of fluoroethylene carbonate, methyl fluoropropionate, fluorobenzene, fluoroethyl methyl carbonate, and fluorodimethylene carbonate.

When these fluorinated solvents are contained in the nonaqueous electrolytic solution, the oxidation resistance of the nonaqueous electrolytic solution is improved.

As a result, even when the battery 10 is charged at high voltage, the battery 10 can be stably operated.

In the battery according to the second embodiment, the electrolyte may be a solid electrolyte.

Examples of the solid electrolyte include organic polymer solid electrolytes, oxide solid electrolytes, and sulfide solid electrolytes.

An example of the organic polymer solid electrolytes is a compound of a polymer compound and a lithium salt.

The polymer compound may have an ethylene oxide structure. In this case, a large amount of the lithium salt can be contained, which further improves the ionic conductivity.

Examples of the oxide solid electrolytes include NASICON solid electrolytes such as $LiTi_2(PO_4)_3$ and its element-substituted derivatives; $(LaLi)TiO_3$-based perovskite solid electrolytes; LISICON solid electrolytes such as $Li_{14}ZnGe_4O_{16}$, $Li_4SiO_4$, $LiGeO_4$, and their element-substituted derivatives; garnet solid electrolytes such as $Li_7La_3Zr_2O_{12}$ and its element-substituted derivatives; $Li_3N$ and its H-substituted derivatives; and $Li_3PO_4$ and its N-substituted derivatives.

Examples of the sulfide solid electrolytes include $Li_2S$—$P_2S_5$, $Li_2S$—$SiS_2$, $Li_2S$—$B_2S_3$, $Li_2S$—$GeS_2$, $Li_{3.25}Ge_{0.25}Po_{0.75}S_4$, and $Li_{10}GeP_2S_{12}$. Furthermore, LiX (X: F, Cl, Br, or I), $MO_y$, $Li_xMO_y$ (M: P, Si, Ge, B, Al, Ga, or In) (x and y: natural number), or the like may be added to the foregoing sulfide solid electrolytes.

In particular, among these solid electrolytes, sulfide solid electrolytes have excellent formability and high ionic conductivity. Therefore, the use of the sulfide solid electrolytes can provide batteries having a higher energy density.

Among the sulfide solid electrolytes, $Li_2S$—$P_2S_5$ has high electrochemical stability and higher ionic conductivity. Therefore, the use of $Li_2S$—$P_2S_5$ as a solid electrolyte can provide batteries having a higher energy density.

A solid electrolyte layer may contain the above-described nonaqueous electrolytic solution.

When a solid electrolyte layer contains the nonaqueous electrolytic solution, lithium ion transfer is facilitated between the active material and the solid electrolyte. This configuration can provide batteries having a higher energy density.

The solid electrolyte layer may contain, for example, a gel electrolyte and an ionic liquid in addition to the solid electrolyte.

The gel electrolyte may be a polymer material containing a nonaqueous electrolytic solution. Examples of the polymer material include polyethylene oxide, polyacrylonitrile, polyvinylidene fluoride, poly(methyl methacrylate), and polymers having an ethylene oxide bond.

Examples of cations for the ionic liquid include chain aliphatic quaternary salts such as tetraalkylammoniums and tetraalkylphosphoniums; alicyclic ammoniums such as pyrrolidiniums, morpholiniums, imidazoliniums, tetrahydropyrimidiniums, piperaziniums, and piperidiniums; and nitrogen-containing heterocyclic aromatic cations such as pyridiniums and imidazoliums. Examples of anions for the ionic liquid include $PF_6^-$, $BF_4^-$, $SbF_6^-$, $AbF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain a lithium salt.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from the foregoing lithium salts may be used alone. Alternatively, two or more lithium salts selected from the foregoing lithium salts may be used as a mixture. The concentration of the lithium salt is, for example, in the range of 0.5 to 2 mol/L.

The battery according to the second embodiment may have various forms. For example, coin batteries, cylinder batteries, prismatic batteries, sheet batteries, button batteries, flat batteries, and stack batteries may be employed.

EXAMPLES

Example 1

Production of Positive Electrode Active Material

Lithium manganese composite oxides ($Li_2MnO_3$ and $LiMnO_2$) and lithium cobaltate ($LiCoO_2$) were obtained by a publicly known method. The obtained $Li_2MnO_3$, $LiMnO_2$, $LiCoO_2$, and LiF were weighed so as to have a molar ratio of $Li_2MnO_3/LiMnO_2/LiCoO_2/LiF=3/1/4/1$.

The weighed raw materials were inserted into a 45 cc zirconia container together with an appropriate amount of φ5 mm zirconia balls, and the container was hermetically sealed in an argon glove box.

The raw materials were then taken out of the argon glove box and treated with a planetary ball mill at 600 rpm for 35 hours.

The obtained compound was then fired in the air at 700° C. for 1 hour to obtain a lithium composite oxide.

Figure 2:
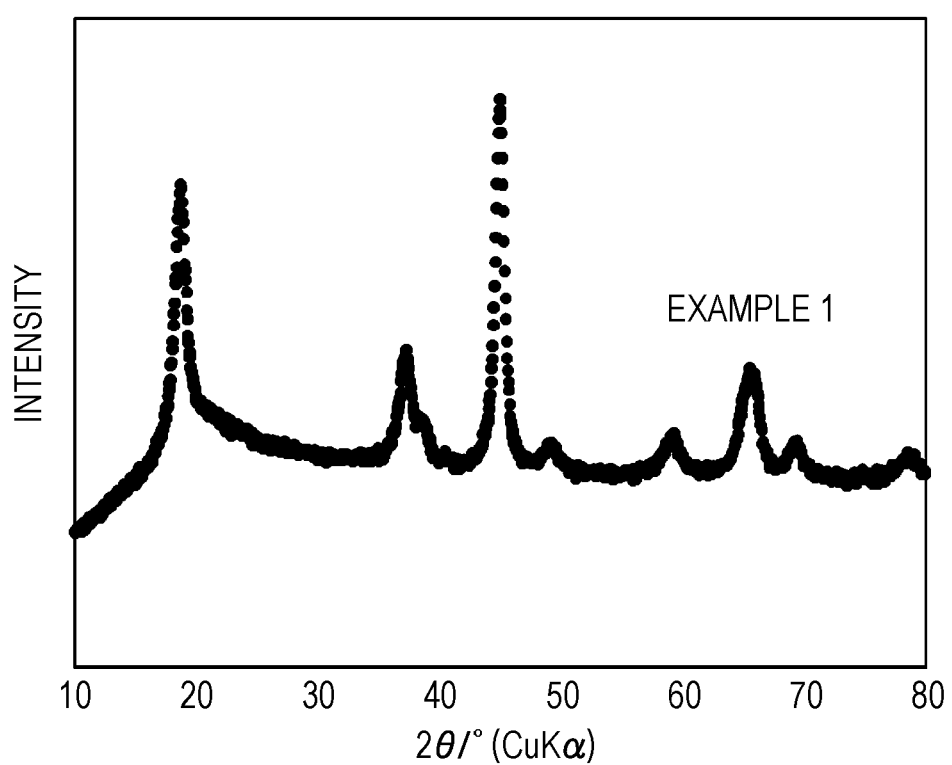
FIG. 2 illustrates an XRD pattern of a lithium composite oxide in Example 1.

The obtained lithium composite oxide was subjected to powder X-ray diffraction measurement. FIG. 2 illustrates the measurement results.

The space group of the obtained lithium composite oxide was R-3m.

The integrated intensity ratio $I_{(003)}/I_{(104)}$ of a peak of a (003) plane to a peak of a (104) plane in the obtained lithium composite oxide was 0.76.

The obtained lithium composite oxide was then surface-treated by an atomic layer deposition method. Specifically, trimethylaluminum and ozone were alternately stacked in a vacuum atmosphere at 150° C. to form an alumina ($Al_2O_3$) coating film on the surface of the lithium composite oxide.

As a result of the observation of the obtained positive electrode active material through X-ray photoelectron spectroscopy, it was confirmed that $Al_2O_3$ was present on the surface of the lithium composite oxide represented by $Li_{1.2}Mn_{0.4}Co_{0.4}O_{1.9}F_{0.1}$.

The $Al_2O_3$ coating film had a thickness of 0.5 nm.

Production of Battery

Subsequently, 70 parts by mass of the positive electrode active material, 20 parts by mass of a conductive agent, 10 parts by mass of polyvinylidene fluoride (PVDF), and an appropriate amount of 2-methylpyrrolidone (NMP) were mixed with each other. Thus, a positive electrode mixture slurry was prepared.

The positive electrode mixture slurry was applied onto one surface of a positive electrode current collector having a thickness of 20 μm and formed of an aluminum foil.

The positive electrode mixture slurry was dried and rolling was performed to obtain a positive electrode plate including a positive electrode active material layer and having a thickness of 60 μm.

The obtained positive electrode plate was stamped into a circular shape with a diameter of 12.5 mm to obtain a positive electrode.

Furthermore, a lithium metal foil having a thickness of 300 μm was stamped into a circular shape with a diameter of 14.0 mm to obtain a negative electrode.

Fluoroethylene carbonate (FEC), ethylene carbonate (EC), and ethyl methyl carbonate (EMC) were mixed at a volume ratio of 1:1:6 to obtain a nonaqueous solvent.

$LiPF_6$ was dissolved in the nonaqueous solvent in a concentration of 1.0 mol/L to obtain a nonaqueous electrolytic solution.

A separator (manufactured by Celgard, LLC., product number: 2320, thickness: 25 μm) was impregnated with the obtained nonaqueous electrolytic solution. The separator is a three-layer separator including a polypropylene layer, a polyethylene layer, and a polypropylene layer.

The positive electrode, the negative electrode, and the separator were assembled in a dry box in which the dew point was controlled to −50° C., and thus a CR2032 coin battery was produced.

Example 2

The thickness of the $Al_2O_3$ coating film was changed from that in Example 1.

Table 1 shows the thickness of the $Al_2O_3$ coating film in Example 2. The thickness of the $Al_2O_3$ coating film was 1.0 nm in Example 2.

Except for this, a positive electrode active material in Example 2 was synthesized in the same manner as in Example 1.

Furthermore, a coin battery in Example 2 was produced in the same manner as in Example 1 using the positive electrode active material in Example 2.

Examples 3 to 6

The covering material added was changed from that in Example 1.

Table 1 shows the composition of each of covering materials used in Examples 3 to 6. ZnO was used in Example 3, $ZrO_2$ was used in Example 4, $TiO_2$ was used in Example 5, and $SiO_2$ was used in Example 6.

Except for this, positive electrode active materials in Examples 3 to 6 were synthesized in the same manner as in Example 1.

Furthermore, coin batteries in Examples 3 to 6 were produced in the same manner as in Example 1 using the positive electrode active materials in Examples 3 to 6.

Examples 7 and 8

The composition of the lithium composite oxide was changed from that in Example 1.

Table 1 shows the composition of each of lithium composite oxides used in Examples 7 and 8. In Example 7, $Li_{1.2}Mn_{0.4}Co_{0.4}O_{1.95}F_{0.05}$ was used. In Example 8, $Li_{1.2}Mn_{0.4}Co_{0.4}O_{1.8}F_{0.2}$ was used.

Except for this, positive electrode active materials in Examples 7 and 8 were synthesized in the same manner as in Example 1.

Furthermore, coin batteries in Examples 7 and 8 were produced in the same manner as in Example 1 using the positive electrode active materials in Examples 7 and 8.

Comparative Examples 1 to 3

Lithium composite oxides in Comparative Examples 1 to 3 were obtained in the same manner as in Examples 1 to 8.

Table 1 shows the composition of each of the lithium composite oxides in Comparative Examples 1 to 3.

Herein, the covering material was not added.

Except for this, positive electrode active materials in Comparative Examples 1 to 3 were produced in the same manner as in Example 1.

Coin batteries in Comparative Examples 1 to 3 were produced in the same manner as in Example 1 using the obtained positive electrode active materials.

Evaluation of Battery

The current density at the positive electrode was set to 0.5 mA/cm$^2$ and the batteries in Examples 1 to 8 and Comparative Examples 1 to 3 were charged until the voltage reached 4.5 V.

Subsequently, the end-of-discharge voltage was set to 2.5 V and the batteries in Examples 1 to 8 and Comparative Examples 1 to 3 were discharged at a current density of 0.5 mA/cm$^2$.

Furthermore, 20 cycles of the charge-discharge test were repeatedly performed to measure the capacity retention of each of the batteries in Examples 1 to 8 and Comparative Examples 1 to 3.

Figure 3:
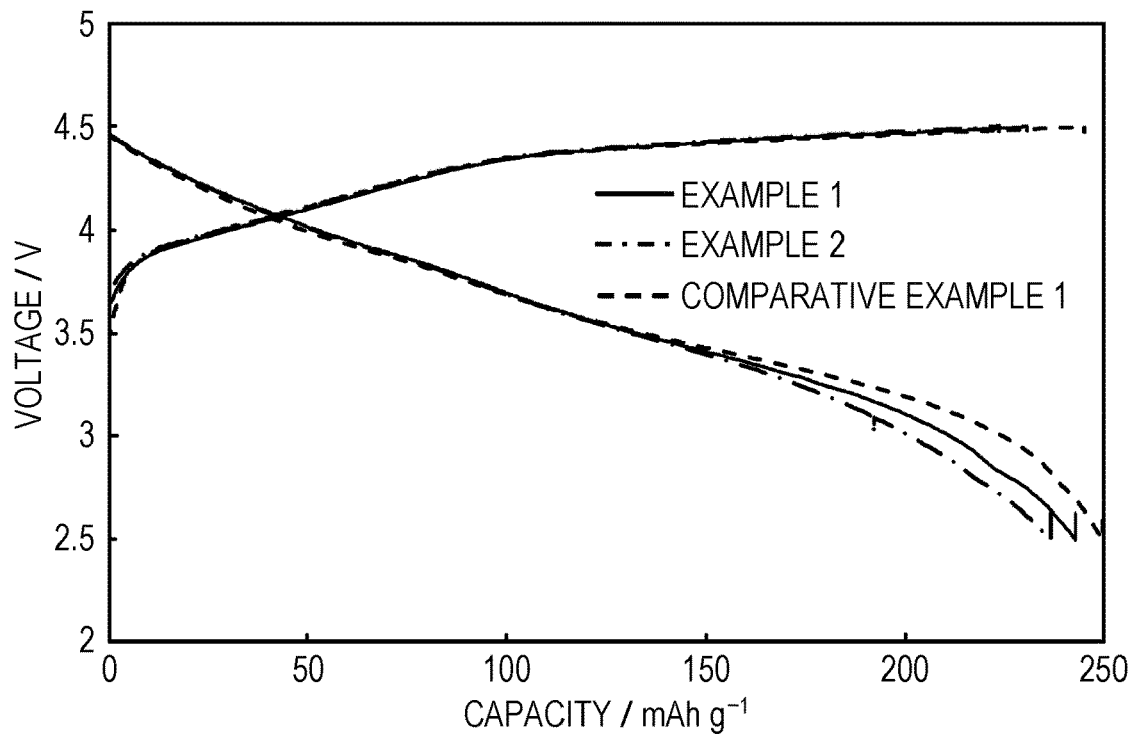
FIG. 3 illustrates the results of an initial charge-discharge test of batteries in Example 1, Example 2, and Comparative Example 1.

FIG. 3 illustrates the results of an initial charge-discharge test of the batteries in Example 1, Example 2, and Comparative Example 1.

Figure 4:
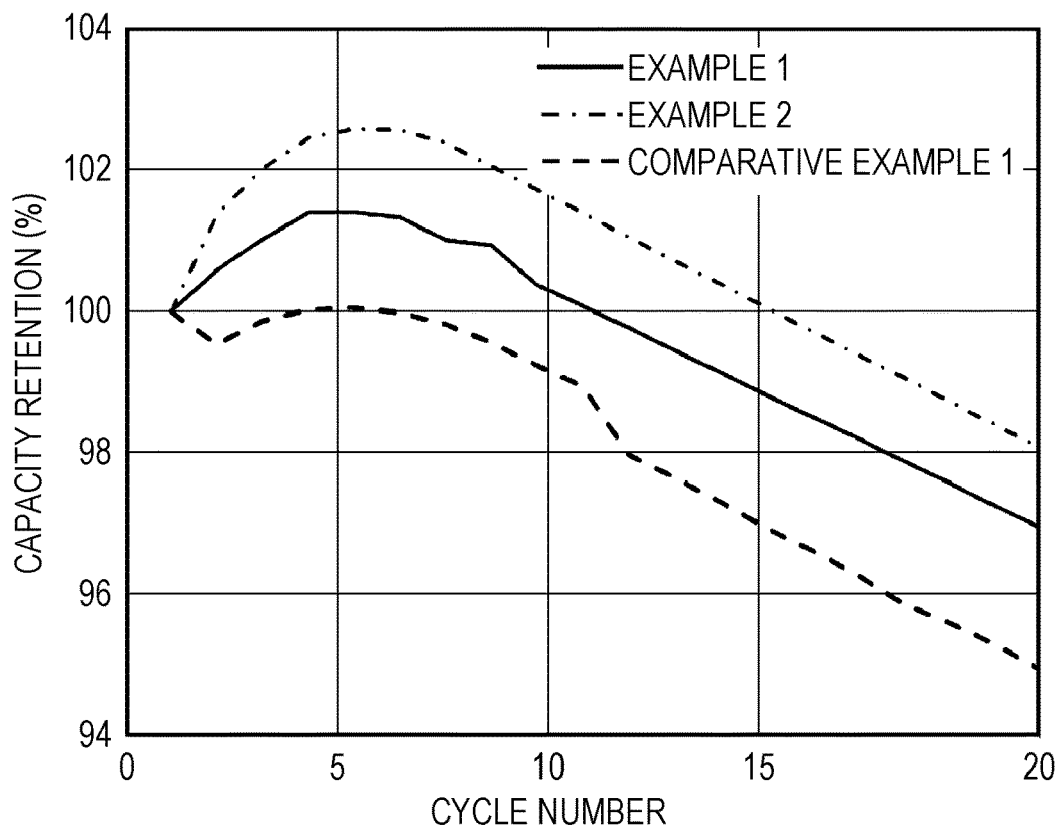
FIG. 4 illustrates the results of a charge-discharge cycle test of batteries in Example 1, Example 2, and Comparative Example 1.

FIG. 4 illustrates the results of a charge-discharge cycle test of the batteries in Example 1, Example 2, and Comparative Example 1.

The initial discharge capacity of the battery in Example 1 was 243 mAh/g. The initial discharge capacity of the battery in Example 2 was 236 mAh/g. On the other hand, the initial discharge capacity of the battery in Comparative Example 1 was 249 mAh/g.

The capacity retention after 20 cycles of the battery in Example 1 was 97%. The capacity retention after 20 cycles of the battery in Example 2 was 98%. On the other hand, the capacity retention after 20 cycles of the battery in Comparative Example 1 was 95%.

Table 1 shows the results.

As shown in Table 1, the batteries in Examples 1 to 6 have a lower initial discharge capacity than that in Comparative Example 1.

The reason for this is believed to be as follows. In the batteries in Examples 1 to 6, the surface of the lithium composite oxide becomes electrochemically inactive due to the coating film of the covering material, which increases the resistance. This decreases the Li conductivity and thus decreases the initial discharge capacity.

In the batteries in Examples 1 to 6, however, it has been found that the discharge capacity is increased during the initial several cycles. FIG. 4 illustrates the results of a charge-discharge cycle test of the batteries in Example 1, Example 2, and Comparative Example 1. This is believed to be because Li that has not contributed to charge and discharge due to the coating film of the covering material can contribute to the reaction after the initial several cycles.

As shown in Table 1, the battery in Example 2 has a lower initial discharge capacity than the battery in Example 1.

As shown in Table 1, the battery in Example 2 has a higher capacity retention after 20 cycles than the battery in Example 1.

The reason for this is believed to be as follows. The battery in Example 2 has a thicker coating film of the covering material than the battery in Example 1. Consequently, the surface of the lithium composite oxide becomes electrochemically inactive, which increases the resistance. This decreases the Li conductivity and thus decreases the initial discharge capacity. On the other hand, for example, the generation of gas due to a side reaction of the lithium composite oxide and the electrolytic solution, the elimination of oxygen, and the generation of a side reaction product

TABLE 1

| | Lithium composite oxide | | | Covering material | | Initial discharge capacity (mAh/g) | Capacity retention (%) |
|---|---|---|---|---|---|---|---|
| | Composition | Space group | $I_{(003)}/I_{(104)}$ | Composition | Thickness (nm) | | |
| Example 1 | $Li_{1.2}Mn_{0.4}Co_{0.4}O_{1.9}F_{0.1}$ | R-3m | 0.76 | $Al_2O_3$ | 0.5 | 243 | 97 |
| Example 2 | $Li_{1.2}Mn_{0.4}Co_{0.4}O_{1.9}F_{0.1}$ | R-3m | 0.79 | $Al_2O_3$ | 1.0 | 236 | 98 |
| Example 3 | $Li_{1.2}Mn_{0.4}Co_{0.4}O_{1.9}F_{0.1}$ | R-3m | 0.72 | ZnO | 0.5 | 227 | 98 |
| Example 4 | $Li_{1.2}Mn_{0.4}Co_{0.4}O_{1.9}F_{0.1}$ | R-3m | 0.65 | $ZrO_2$ | 0.5 | 235 | 97 |
| Example 5 | $Li_{1.2}Mn_{0.4}Co_{0.4}O_{1.9}F_{0.1}$ | R-3m | 0.89 | $TiO_2$ | 0.5 | 240 | 96 |
| Example 6 | $Li_{1.2}Mn_{0.4}Co_{0.4}O_{1.9}F_{0.1}$ | R-3m | 0.84 | $SiO_2$ | 0.5 | 238 | 96 |
| Example 7 | $Li_{1.2}Mn_{0.4}Co_{0.4}O_{1.95}F_{0.05}$ | R-3m | 0.79 | $Al_2O_3$ | 0.5 | 242 | 95 |
| Example 8 | $Li_{1.2}Mn_{0.4}Co_{0.4}O_{1.8}F_{0.2}$ | R-3m | 0.78 | $Al_2O_3$ | 0.5 | 233 | 96 |
| Comparative Example 1 | $Li_{1.2}Mn_{0.4}Co_{0.4}O_{1.9}F_{0.1}$ | R-3m | 0.75 | — | — | 249 | 95 |
| Comparative Example 2 | $Li_{1.2}Mn_{0.4}Co_{0.4}O_{1.95}F_{0.05}$ | R-3m | 0.78 | — | — | 243 | 92 |
| Comparative Example 3 | $Li_{1.2}Mn_{0.4}Co_{0.4}O_{1.8}F_{0.2}$ | R-3m | 0.79 | — | — | 230 | 95 |

As shown in Table 1, the batteries in Examples 1 to 6 have a higher capacity retention after 20 cycles than the battery in Comparative Example 1.

The reason for this is believed to be as follows. The batteries in Examples 1 to 6 contain a covering material. That is, the direct contact between the surface of the lithium composite oxide and the electrolytic solution is suppressed by the covering material. This suppresses, for example, the generation of gas due to a side reaction of the lithium composite oxide and the electrolytic solution, the elimination of oxygen, and the generation of a side reaction product onto the surface of the positive electrode active material. Thus, the capacity retention after 20 cycles is improved.

onto the surface of the positive electrode active material are further suppressed. Thus, the capacity retention after 20 cycles is improved.

As shown in Table 1, the battery in Example 1 has a higher initial discharge capacity than the batteries in Examples 3 to 6.

The reason for this is believed to be as follows. In the battery in Example 1, $Al_2O_3$ is used as a covering material. As a result, $Al_2O_3$ reacts with Li on the surface of the lithium composite oxide, thereby forming $LiAlO_2$. This improves the Li conductivity. Thus, the initial discharge capacity is improved.

As shown in Table 1, the battery in Example 7 has a higher capacity retention after 20 cycles than the battery in Comparative Example 2.

As shown in Table 1, the battery in Example 8 has a higher capacity retention after 20 cycles than the battery in Comparative Example 3.

The reason for this is believed to be as follows. The batteries in Examples 7 and 8 contain a covering material. That is, the cycle characteristics of the positive electrode active material in the present disclosure are improved regardless of the chemical composition of the lithium composite oxides in Examples 1 to 8.

Hereafter, Reference Examples will be described. The positive electrode active materials in Reference Examples below contain a lithium composite oxide but not the covering material according to the present disclosure.

Reference Example 1

Lithium manganese composite oxides ($Li_2MnO_3$ and $LiMnO_2$) and lithium cobaltate ($LiCoO_2$) were obtained by a publicly known method. The obtained $Li_2MnO_3$, $LiMnO_2$, $LiCoO_2$, and LiF were weighed so as to have a molar ratio of $Li_2MnO_3/LiMnO_2/LiCoO_2/LiF=3/1/4/1$.

The weighed raw materials were inserted into a 45 cc zirconia container together with an appropriate amount of φ5 mm zirconia balls, and the container was hermetically sealed in an argon glove box.

The raw materials were then taken out of the argon glove box and treated with a planetary ball mill at 600 rpm for 35 hours.

The obtained compound was then fired in the air at 700° C. for 1 hour.

The obtained positive electrode active material was subjected to powder X-ray diffraction measurement.

The space group of the obtained positive electrode active material was R-3m.

The integrated intensity ratio $I_{(003)}/I_{(104)}$ of a peak of a (003) plane to a peak of a (104) plane in the obtained positive electrode active material was 0.75.

The composition of the obtained positive electrode active material was determined by ICP emission spectrometry, an inert gas fusion-infrared absorption method, and ion chromatography.

As a result, the positive electrode active material had a composition of $Li_{1.2}Mn_{0.4}Co_{0.4}O_{1.9}F_{0.1}$.

A coin battery in Reference Example 1 was produced in the same manner as in Example 1 using the obtained positive electrode active material.

Reference Examples 2 to 19

The precursors and the mixing ratio were changed from those in Reference Example 1.

Table 2 shows the composition of each of the positive electrode active materials in Reference Examples 2 to 19.

The firing conditions were changed within 300° C. to 700° C. and 1 to 5 hours from those in Reference Example 1.

Except for this, positive electrode active materials in Reference Examples 2 to 19 were synthesized in the same manner as in Reference Example 1.

The precursors in Reference Examples 2 to 19 were weighed on a stoichiometric basis and mixed with each other in the same manner as in Reference Example 1.

For example, in Reference Example 9, the precursors were weighed so as to have a molar ratio of $Li_2MnO_3/LiMnO_2/LiNiO_2/LiF=3/1/4/1$ and mixed with each other.

The space group of each of the compounds obtained as the positive electrode active materials in Reference Examples 2 to 19 was R-3m.

Coin batteries were produced in the same manner as in Reference Example 1 using the positive electrode active materials in Reference Examples 2 to 19.

Reference Example 20

Lithium cobaltate ($LiCoO_2$) was obtained by a publicly known method.

The obtained lithium cobaltate was subjected to powder X-ray diffraction measurement.

The space group of the obtained lithium cobaltate was R-3m.

The integrated intensity ratio $I_{(003)}/I_{(104)}$ of a peak of a (003) plane to a peak of a (104) plane in the obtained lithium cobaltate was 1.20.

A coin battery in Reference Example 20 was produced in the same manner as in Reference Example 1 using the obtained lithium cobaltate as a positive electrode active material.

Reference Example 21

$Li_2MnO_3$, $LiMnO_2$, $LiCoO_2$, and LiF were weighed so as to have a molar ratio of $Li_2MnO_3/LiMnO_2/LiCoO_2/LiF=3/1/4/1$.

The weighed raw materials were inserted into a 45 cc zirconia container together with an appropriate amount of φ5 mm zirconia balls, and the container was hermetically sealed in an argon glove box.

The raw materials were then taken out of the argon glove box and treated with a planetary ball mill at 600 rpm for 35 hours.

The obtained compound was then fired in the air at 800° C. for 1 hour.

The obtained compound was subjected to powder X-ray diffraction measurement.

The space group of the obtained compound was R-3m.

The integrated intensity ratio $I_{(003)}/I_{(104)}$ of a peak of a (003) plane to a peak of a (104) plane in the obtained compound was 0.92.

The composition of the obtained compound was determined by ICP emission spectrometry, an inert gas fusion-infrared absorption method, and ion chromatography.

As a result, the obtained compound had a composition of $Li_{1.2}Mn_{0.4}Co_{0.4}O_{1.9}F_{0.1}$.

A coin battery in Reference Example 21 was produced in the same manner as in Reference Example 1 using the obtained compound as a positive electrode active material.

Reference Example 22

$Li_2MnO_3$ and $LiCoO_2$ were weighed so as to have a molar ratio of $Li_2MnO_3/LiCoO_2=1/1$.

The weighed raw materials were inserted into a 45 cc zirconia container together with an appropriate amount of φ5 mm zirconia balls, and the container was hermetically sealed in an argon glove box.

The raw materials were then taken out of the argon glove box and treated with a planetary ball mill at 600 rpm for 35 hours.

The obtained compound was then fired in the air at 700° C. for 1 hour.

The obtained compound was subjected to powder X-ray diffraction measurement.

The space group of the obtained compound was R-3m.

The integrated intensity ratio $I_{(003)}/I_{(104)}$ of a peak of a (003) plane to a peak of a (104) plane in the obtained compound was 0.75.

The composition of the obtained compound was determined by ICP emission spectrometry, an inert gas fusion-infrared absorption method, and ion chromatography.

As a result, the obtained compound had a composition of $Li_{1.2}Mn_{0.4}Co_{0.4}O_2$.

A coin battery in Reference Example 22 was produced in the same manner as in Reference Example 1 using the obtained compound as a positive electrode active material.

Evaluation of Battery

The current density at the positive electrode was set to 0.5 mA/cm² and the battery in Reference Example 1 was charged until the voltage reached 4.5 V.

Subsequently, the end-of-discharge voltage was set to 2.5 V and the battery in Reference Example 1 was discharged at a current density of 0.5 mA/cm².

The initial energy density of the battery in Reference Example 1 was 4000 Wh/L.

Furthermore, the current density at the positive electrode was set to 0.5 mA/cm² and the battery in Reference Example 20 was charged until the voltage reached 4.3 V.

Subsequently, the end-of-discharge voltage was set to 3.0 V and the battery in Reference Example 20 was discharged at a current density of 0.5 mA/cm².

The initial energy density of the battery in Reference Example 20 was 2500 Wh/L.

Similarly, the initial energy density of each of the coin batteries in Reference Examples 2 to 19, 21, and 22 was measured.

Table 2 shows the results.

TABLE 2

| | Composition | x/y | α/β | (x + y)/(α + β) | $I_{(003)}/I_{(104)}$ | Space group | Energy density (Wh/L) |
|---|---|---|---|---|---|---|---|
| Reference Example 1 | $Li_{1.2}Mn_{0.4}Co_{0.4}O_{1.9}F_{0.1}$ | 1.5 | 19 | 1.0 | 0.75 | R-3m | 4000 |
| Reference Example 2 | $Li_{1.2}Mn_{0.4}Co_{0.4}O_{1.9}F_{0.1}$ | 1.5 | 19 | 1.0 | 0.69 | R-3m | 3750 |
| Reference Example 3 | $Li_{1.2}Mn_{0.4}Co_{0.4}O_{1.9}F_{0.1}$ | 1.5 | 19 | 1.0 | 0.85 | R-3m | 3710 |
| Reference Example 4 | $Li_{1.2}Mn_{0.35}Co_{0.45}O_{1.9}F_{0.1}$ | 1.5 | 19 | 1.0 | 0.77 | R-3m | 3900 |
| Reference Example 5 | $Li_{1.2}Mn_{0.4}Co_{0.4}O_{1.95}F_{0.05}$ | 1.5 | 39 | 1.0 | 0.78 | R-3m | 3800 |
| Reference Example 6 | $Li_{1.2}Mn_{0.4}Co_{0.4}O_{1.8}F_{0.2}$ | 1.5 | 9 | 1.0 | 0.79 | R-3m | 3430 |
| Reference Example 7 | $Li_{1.2}Mn_{0.4}Co_{0.4}O_{1.67}F_{0.33}$ | 1.5 | 5 | 1.0 | 0.77 | R-3m | 3160 |
| Reference Example 8 | $Li_{1.2}Mn_{0.8}O_{1.9}F_{0.1}$ | 1.5 | 19 | 1.0 | 0.67 | R-3m | 3520 |
| Reference Example 9 | $Li_{1.2}Mn_{0.4}Ni_{0.4}O_{1.9}F_{0.1}$ | 1.5 | 19 | 1.0 | 0.82 | R-3m | 3390 |
| Reference Example 10 | $Li_{1.2}Mn_{0.4}Co_{0.4}O_{1.95}Cl_{0.05}$ | 1.5 | 39 | 1.0 | 0.76 | R-3m | 3210 |
| Reference Example 11 | $Li_{1.2}Mn_{0.4}Co_{0.4}O_{1.95}N_{0.05}$ | 1.5 | 39 | 1.0 | 0.76 | R-3m | 3160 |
| Reference Example 12 | $Li_{1.2}Mn_{0.4}Co_{0.4}O_{1.95}S_{0.05}$ | 1.5 | 39 | 1.0 | 0.72 | R-3m | 3100 |
| Reference Example 13 | $Li_{1.2}Mn_{0.4}Co_{0.4}O_{1.95}F_{0.025}Cl_{0.025}$ | 1.5 | 39 | 1.0 | 0.74 | R-3m | 3200 |
| Reference Example 14 | $Li_{1.0}Mn_{0.5}Co_{0.5}O_{1.9}F_{0.1}$ | 1.0 | 19 | 1.0 | 0.72 | R-3m | 3040 |
| Reference Example 15 | $Li_{1.5}Mn_{0.25}Co_{0.25}O_{1.9}F_{0.1}$ | 3.0 | 19 | 1.0 | 0.81 | R-3m | 3080 |
| Reference Example 16 | $Li_{0.5}Mn_{0.5}Co_{0.5}O_{1.9}F_{0.1}$ | 0.5 | 19 | 0.75 | 0.62 | R-3m | 3010 |
| Reference Example 17 | $Li_{1.4}Mn_{0.45}Co_{0.45}O_{1.9}F_{0.1}$ | 1.56 | 19 | 1.15 | 0.79 | R-3m | 3560 |
| Reference Example 18 | $Li_{1.33}Mn_{0.33}Co_{0.34}O_{1.9}F_{0.1}$ | 2 | 19 | 1.0 | 0.79 | R-3m | 3200 |
| Reference Example 19 | $Li_{1.14}Mn_{0.38}Co_{0.38}O_{1.9}F_{0.1}$ | 1.5 | 19 | 0.95 | 0.69 | R-3m | 3150 |
| Reference Example 20 | $LiCoO_2$ | 1.0 | — | 1.0 | 1.20 | R-3m | 2500 |
| Reference Example 21 | $Li_{1.2}Mn_{0.4}Co_{0.4}O_{1.9}F_{0.1}$ | 1.5 | 19 | 1.0 | 0.92 | R-3m | 2200 |
| Reference Example 22 | $Li_{1.2}Mn_{0.4}Co_{0.4}O_{2.0}$ | 1.5 | — | 1.0 | 0.75 | R-3m | 2900 |

As shown in Table 2, the batteries in Reference Examples 1 to 19 have a much higher initial energy density than the batteries in Reference Examples 20 to 22.

The reason for this is believed to be as follows. In Reference Examples 1 to 19, the lithium composite oxide in the positive electrode active material contains one or more elements selected from the group consisting of F, Cl, N, S, Br, and I and has a crystal structure that belongs to a space group R-3m, and the integrated intensity ratio $I_{(003)}/I_{(104)}$ of a peak of a (003) plane to a peak of a (104) plane in an XRD pattern satisfies $0.62 \leq I_{(003)}/I_{(104)} \leq 0.90$. Thus, the energy density is improved.

In Reference Example 21, the ratio $I_{(003)}/I_{(104)}$ is 0.92. Therefore, it is believed that the cation mixing is suppressed and the number of three-dimensional diffusion paths of lithium is decreased, which inhibits the diffusion of lithium and thus decreases the energy density.

In Reference Example 22, an electrochemically inactive anion such as F, Cl, N, or S is not contained. Therefore, it is believed that the crystal structure is destabilized, which decreases the energy density.

As shown in Table 2, the batteries in Reference Examples 2 and 3 have a lower initial energy density than the battery in Reference Example 1. The reason for this is believed to be as follows. The ratio $I_{(003)}/I_{(104)}$ is smaller in Reference Example 2 than in Reference Example 1. That is, the degree of cation mixing is large and thus the crystal structure is relatively destabilized, which decreases the energy density. Furthermore, the ratio $I_{(003)}/I_{(104)}$ is larger in Reference Example 3 than in Reference Example 1. That is, the degree of cation mixing is insufficient and thus the formation of three-dimensional diffusion paths of Li is inhibited, which decreases the energy density.

As shown in Table 2, the batteries in Reference Examples 5 and 6 have a lower initial energy density than the battery in Reference Example 1.

The reason for this is believed to be as follows. The ratio $\alpha/\beta$ is larger in Reference Example 5 than in Reference Example 1. That is, an excess increase in the capacity due to the oxidation-reduction reaction of oxygen and a decrease in the influence of electrochemically inactive anions destabilize the structure when Li is deintercalated. Thus, the energy density is decreased. Furthermore, the ratio $\alpha/\beta$ is smaller in Reference Example 6 than in Reference Example 1. That is, the amount of charge compensation due to the oxidation-reduction reaction of oxygen is decreased and the influence of electrochemically inactive anions is increased, which decreases the electron conductivity. Thus, the energy density is decreased.

As shown in Table 2, the battery in Reference Example 7 has a lower initial energy density than the battery in Reference Example 6.

The reason for this is believed to be as follows. The ratio $\alpha/\beta$ is smaller in Reference Example 7 than in Reference Example 6. That is, the amount of charge compensation due to the oxidation-reduction reaction of oxygen is decreased and the influence of electrochemically inactive anions is increased, which decreases the electron conductivity. Thus, the energy density is decreased.

As shown in Table 2, the batteries in Reference Examples 8 and 9 have a lower initial energy density than the battery in Reference Example 1.

The reason for this is believed to be as follows. In Reference Example 8, only Mn is contained as a cation element other than Li and therefore the elimination of oxygen is facilitated, which destabilizes the crystal structure. Thus, the energy density is decreased. In Reference Example 9, Ni, which has orbitals less overlapped with those of oxygen than Co, is used as a cation element instead of Co, and therefore a sufficient capacity due to the oxidation-reduction reaction of oxygen is not provided. Thus, the energy density is decreased.

As shown in Table 2, the batteries in Reference Examples 10 to 13 have a lower initial energy density than the battery in Reference Example 5.

The reason for this is believed to be as follows. In Reference Examples 10 to 13, anions having a lower electronegativity than F are used instead of F and therefore the cation-anion interaction is decreased. Thus, the energy density is decreased.

As shown in Table 2, the battery in Reference Example 14 has a lower initial energy density than the battery in Reference Example 1.

The reason for this is believed to be as follows. The ratio x/y is smaller in Reference Example 14 (x/y=1) than in Reference Example 1 and therefore the percolation paths of Li are not appropriately provided, which decreases the diffusibility of Li ions. Thus, the energy density is decreased.

As shown in Table 2, the battery in Reference Example 15 has a lower initial energy density than the battery in Reference Example 1.

The reason for this is believed to be as follows. The ratio x/y is larger in Reference Example 15 (x/y=3) than in Reference Example 1. Therefore, an excessive amount of Li in a crystal structure is extracted during the initial charge of the battery, which destabilizes the crystal structure. This decreases the amount of Li intercalated during discharge. Thus, the energy density is decreased.

As shown in Table 2, the battery in Reference Example 16 has a lower initial energy density than the battery in Reference Example 1.

The reason for this is believed to be as follows. The ratio x/y is smaller in Reference Example 16 (x/y=0.5) than in Reference Example 1 and the ratio $(x+y)/(\alpha+\beta)$ is also smaller in Reference Example 16 $((x+y)/(\alpha+\beta)=0.75)$ than in Reference Example 1. That is, Mn and Co are regularly arranged because of Li deficits during synthesis and therefore the percolation paths of Li ions are not sufficiently provided, which decreases the diffusibility of Li ions. Thus, the energy density is decreased.

As shown in Table 2, the battery in Reference Example 17 has a lower initial energy density than the battery in Reference Example 1.

The reason for this is believed to be as follows. The ratio $(x+y)/(\alpha+\beta)$ is larger in Reference Example 17 $((x+y)/(\alpha+\beta)=1.15)$ than in Reference Example 1. That is, the elimination of oxygen during charge proceeds because of anion deficits in an initial structure, which destabilizes the crystal structure. Thus, the energy density is decreased.

As shown in Table 2, the battery in Reference Example 18 has a lower initial energy density than the battery in Reference Example 1.

The reason for this is believed to be as follows. The ratio x/y is larger in Reference Example 18 (x/y=1.99) than in Reference Example 1. Therefore, an excessive amount of Li in a crystal structure is extracted during the initial charge of the battery, which destabilizes the crystal structure. As a result, the amount of Li intercalated during discharge is decreased. Thus, the energy density is decreased.

As shown in Table 2, the battery in Reference Example 19 has a lower initial energy density than the battery in Reference Example 1.

The reason for this is believed to be as follows. The ratio $(x+y)/(a+13)$ is smaller in Reference Example 19 $((x+y)/(a+(3)=0.95)$ than in Reference Example 1. Therefore, Mn and Co are regularly arranged because of a trace amount of Li deficits formed during synthesis and thus the percolation paths of Li ions are not sufficiently provided, which decreases the diffusibility of Li ions. Furthermore, the ratio $I_{(003)}/I_{(104)}$ is smaller in Reference Example 19 than in Reference Example 1. That is, the degree of cation mixing is large and thus the crystal structure is relatively destabilized, which decreases the energy density.

What is claimed is:

1. A positive electrode active material comprising:
   a lithium composite oxide containing at least one element selected from the group consisting of fluorine, chlorine, nitrogen, sulfur, bromine, and iodine; and
   a covering material that covers a surface of the lithium composite oxide,
   wherein the lithium composite oxide is represented by a formula $Li_xMe_yO_\alpha X_\beta$,
   where Me is at least one selected from the group consisting of Mn, Co, Ni, Fe, Al, Cu, V, Nb, Mo, Ti, Cr, Zn, Na, K, Ca, Mg, Pt, Au, Ag, Ru, W, B, Si, and P; X is at least one selected from the group consisting of F, Cl, N, S, Br, and I; and $0.5 \le x \le 1.5$, $0.5 \le y \le 1.0$, $1 \alpha < 2$, $0 < \beta \le 1$, and $5 \le \alpha/\beta \le 39$,
   the lithium composite oxide has a crystal structure that belongs to a space group R-3m, and
   a ratio $I_{(003)}/I_{(104)}$ of a first integrated intensity $I_{(003)}$ of a first peak corresponding to a (003) plane to a second integrated intensity $I_{(104)}$ of a second peak corresponding to a (104) plane in an XRD pattern of the lithium composite oxide satisfies $0.62 \le I_{(003)}/I_{(104)} \le 0.90$.

2. The positive electrode active material according to claim 1,
   wherein the covering material is an inorganic material.

3. The positive electrode active material according to claim 1,
   wherein a mass ratio of the covering material to the lithium composite oxide is 0.01 or more and 0.2 or less.

4. The positive electrode active material according to claim 3,
   wherein the mass ratio of the covering material to the lithium composite oxide is 0.01 or more and 0.1 or less.

5. The positive electrode active material according to claim 1,
   wherein the covering material has a thickness of 0.1 nm or more and 2.0 nm or less.

6. The positive electrode active material according to claim 1,
   wherein the covering material forms a solid solution with at least a part of the surface of the lithium composite oxide.

7. The positive electrode active material according to claim 1,
   wherein the covering material is an oxide.

8. The positive electrode active material according to claim 7,
   wherein the oxide of the covering material is represented by a formula $Li_aA_bO_c$,
   where A is at least one selected from the group consisting of Mn, Co, Ni, Fe, Cu, Nb, Mo, Ti, Al, Cr, Zr, Zn, Na, K, Ca, Mg, Pt, Au, B, P, Eu, Sm, Ce, and H; and $0 \le a \le 3$, $0.5 \le b \le 4$, and $1 \le c \le 4$.

9. The positive electrode active material according to claim 8,
   wherein the oxide of the covering material is at least one selected from the group consisting of $Al_2O_3$, $ZrO_2$, ZnO, $TiO_2$, and $SiO_2$.

10. The positive electrode active material according to claim 1,
    wherein $0.67 \le I_{(003)}/I_{(104)}$ 0.85.

11. The positive electrode active material according to claim 1,
    wherein the lithium composite oxide contains manganese.

12. The positive electrode active material according to claim 1,
    wherein the lithium composite oxide contains fluorine.

13. The positive electrode active material according to claim 1,
    wherein $1.67 \le \alpha \le 1.95$.

14. The positive electrode active material according to claim 1,
    wherein $0.05 \le \beta \le 0.33$.

15. The positive electrode active material according to claim 1,
    wherein $0.5 \le x/y \le 3.0$.

16. The positive electrode active material according to claim 1,
    wherein $9 \le \alpha/\beta \le 19$.

17. The positive electrode active material according to claim 1,
    wherein $0.75 \le (x+y)/(\alpha+\beta) \le 1.15$.

18. The positive electrode active material according to claim 1,
    wherein a mass ratio of the lithium composite oxide relative to an entire positive electrode active material is 50% or more.

19. A battery comprising:
    a positive electrode containing the positive electrode active material according to claim 1;
    a negative electrode; and
    an electrolyte.

20. The battery according to claim 19,
    wherein the negative electrode contains:
    a negative electrode active material that allows a lithium ion to be inserted therein and released therefrom; or
    a material that allows lithium metal to be dissolved and deposited thereon, and
    the electrolyte is a nonaqueous electrolytic solution.

21. The battery according to claim 19,
    wherein the negative electrode contains:
    a negative electrode active material that allows a lithium ion to be inserted therein and released therefrom; or
    a material that allows lithium metal to be dissolved and deposited thereon, and
    the electrolyte is a solid electrolyte.

* * * * *